(12) United States Patent
Choi et al.

(10) Patent No.: US 9,552,019 B2
(45) Date of Patent: *Jan. 24, 2017

(54) PORTABLE TERMINAL HAVING DISPLAY BUTTONS AND METHOD OF INPUTTING FUNCTIONS USING DISPLAY BUTTONS

(71) Applicant: SAMSUNG ELECTRONICS CO., LTD., Suwon-si, Gyeonggi-do (KR)

(72) Inventors: Chang-kyu Choi, Seongnam-si (KR); Wook Chang, Seoul (KR); Sun-gi Hong, Hwaseong-si (KR); Won-chul Bang, Seongnam-si (KR); Jung-hyun Shim, Seongnam-si (KR); Soon-joo Kwon, Seoul (KR); Seong-woon Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,507

(22) Filed: Jan. 28, 2016

(65) Prior Publication Data

US 2016/0147265 A1 May 26, 2016

Related U.S. Application Data

(63) Continuation of application No. 14/165,047, filed on Jan. 27, 2014, now Pat. No. 9,250,770, which is a
(Continued)

(30) Foreign Application Priority Data

Apr. 1, 2005 (KR) .................. 10-2005-0027557
Aug. 4, 2005 (KR) .................. 10-2005-0071395

(51) Int. Cl.
*G06F 3/0482* (2013.01)
*G06F 1/16* (2006.01)
(Continued)

(52) U.S. Cl.
CPC ............ *G06F 1/1671* (2013.01); *G06F 1/165* (2013.01); *G06F 1/1626* (2013.01);
(Continued)

(58) Field of Classification Search
CPC .. G06F 3/0482; G06F 3/0238; G06F 3/04842; H04M 1/7258; H04M 1/23; H04M 1/72544; H04M 1/72552; H04M 2250/52; H01H 2219/002; H01H 2219/046
See application file for complete search history.

(56) References Cited

U.S. PATENT DOCUMENTS

| | | |
|---|---|---|
| 4,987,279 A | 1/1991 | Hirose et al. |
| 5,278,362 A | 1/1994 | Ohashi |

(Continued)

FOREIGN PATENT DOCUMENTS

| | | |
|---|---|---|
| JP | 63-72636 | 5/1988 |
| JP | 63-109523 | 5/1988 |

(Continued)

OTHER PUBLICATIONS

"Details: Apple files major chameleonic iPod touch display patent", Oct. 26, 2006, http://www.macnn.com/blogs/?p=136 (nine-page article).
(Continued)

*Primary Examiner* — Premal Patel
(74) *Attorney, Agent, or Firm* — Staas & Halsey LLP

(57) ABSTRACT

A portable terminal including: a controller receiving signals corresponding to a plurality of input buttons and outputting image data to be displayed on the plurality of input buttons using the received signals; and a plurality of buttons for inputting a key from a user and outputting a signal corresponding to the key pressed, and for receiving the image data from the controller and displaying the received image data. By using the display buttons for displaying variable
(Continued)

images corresponding to specific functions as well as an essential function of inputting keys from a user when a specific function is input in the portable terminal, a plurality of functions can be input with only a few buttons, providing speed and convenience to the user for function input.

1 Claim, 25 Drawing Sheets

Related U.S. Application Data continuation of application No. 11/393,894, filed on Mar. 31, 2006, now abandoned.

(51) Int. Cl.
G06F 3/023 (2006.01)
G06F 3/0484 (2013.01)
H04M 1/23 (2006.01)
H04M 1/725 (2006.01)

(52) U.S. Cl.
CPC .......... *G06F 1/1686* (2013.01); *G06F 3/0238* (2013.01); *G06F 3/0482* (2013.01); *G06F 3/04842* (2013.01); *H04M 1/7258* (2013.01); *H01H 2219/002* (2013.01); *H01H 2219/046* (2013.01); *H04M 1/23* (2013.01); *H04M 1/72544* (2013.01); *H04M 1/72552* (2013.01); *H04M 2250/52* (2013.01)

(56) References Cited

U.S. PATENT DOCUMENTS

| | | | |
|---|---|---|---|
| 5,900,599 | A | 5/1999 | Ohashi et al. |
| 5,914,676 | A | 6/1999 | Akpa |
| 6,256,020 | B1 | 7/2001 | Pabo et al. |
| 6,344,622 | B1 | 2/2002 | Takiguchi et al. |
| 6,466,202 | B1* | 10/2002 | Suso ............... G06F 1/1616 345/158 |
| 6,563,492 | B1 | 5/2003 | Furuya |
| 6,597,374 | B1 | 7/2003 | Baker et al. |
| 6,628,245 | B2* | 9/2003 | Ishii ............... G06F 3/0238 340/461 |
| 6,798,359 | B1 | 9/2004 | Ivancic |
| 6,829,512 | B2 | 12/2004 | Huang et al. |
| 9,250,770 | B2 | 2/2016 | Choi |
| 2002/0158983 | A1* | 10/2002 | Fellegara ............... G03B 17/48 348/333.11 |
| 2003/0101178 | A1 | 5/2003 | Miyata et al. |
| 2003/0151982 | A1 | 8/2003 | Brewer et al. |
| 2004/0012557 | A1 | 1/2004 | Daniel |
| 2004/0018858 | A1* | 1/2004 | Nelson ............ H04M 1/72547 455/566 |
| 2004/0056837 | A1* | 3/2004 | Koga ................... G06F 1/16 345/156 |
| 2004/0125078 | A1* | 7/2004 | Nishimori ............ G06F 3/0238 345/156 |
| 2005/0071153 | A1 | 3/2005 | Tammi et al. |
| 2006/0197753 | A1* | 9/2006 | Hotelling ............ G06F 1/1626 345/173 |
| 2006/0238517 | A1* | 10/2006 | King .................... G06F 1/1626 345/173 |

FOREIGN PATENT DOCUMENTS

| | | |
|---|---|---|
| JP | 2002-094629 | 3/2002 |
| JP | 2002-354079 | 12/2002 |
| JP | 2003-271295 | 9/2003 |
| JP | 2003-303526 | 10/2003 |
| JP | 2004-178551 | 6/2004 |
| JP | 2006-004063 | 1/2006 |
| KR | 10-2000-0066068 | 11/2000 |

OTHER PUBLICATIONS

Japanese Office Action dated Dec. 21, 2010, issued in corresponding Japanese Patent Application No. 2006-102150, 6 pages.
Notice of Allowance mailed Nov. 15, 2011 in corresponding Japanese Application No. JP2006-102150, 3 pages.
Korean Office Action dated Oct. 31, 2011 in corresponding Korean Patent Application No. 10-2006-0029812, 6 pages.
Korean Office Action for related Korean Patent Application No. 10-2007-0084433, mailed on Jan. 26, 2012, 7 pages.
Korean Office Action for related Korean Patent Application No. 10-2007-0084434, mailed on Jan. 20, 2012, 9 pages.
Non-final Office Action dated Jan. 27, 2009 in U.S. Appl. No. 11/393,894 (19 pages).
Supplemental Non-final Office Action dated Mar. 6, 2009 in U.S. Appl. No. 11/393,894 (19 pages).
Non-final Office Action dated Nov. 16, 2009 in U.S. Appl. No. 11/393,894 (15 pages).
Final Office Action dated Mar. 30, 2010 in U.S. Appl. No. 11/393,894 (17 pages).
Advisory Action dated Jul. 16, 2010 in U.S. Appl. No. 11/393,894 (3 pages).
Non-final Office Action dated Aug. 31, 2010 in U.S. Appl. No. 11/393,894 (18 pages).
Final Office Action dated Jan. 25, 2011 in U.S. Appl. No. 11/393,894 (18 pages).
Non-final Office Action dated Sep. 27, 2011 in U.S. Appl. No. 11/393,894 (21 pages).
Final Office Action dated Feb. 14, 2012 in U.S. Appl. No. 11/393,894 (22 pages).
Non-final Office Action dated Jan. 7, 2013 in U.S. Appl. No. 11/393,894 (38 pages).
Final Office Action dated Aug. 15, 2013 in U.S. Appl. No. 11/393,894 (38 pages).
Notice of Allowance dated Sep. 25, 2015 in U.S. Appl. No. 14/165,047 (18 pages).
U.S. Appl. No. 11/393,894, filed Mar. 31, 2006, Chang-kyu Choi, Samsung Electronics Co., Ltd. (abandoned).

* cited by examiner

FIG. 6A
FIG. 6B
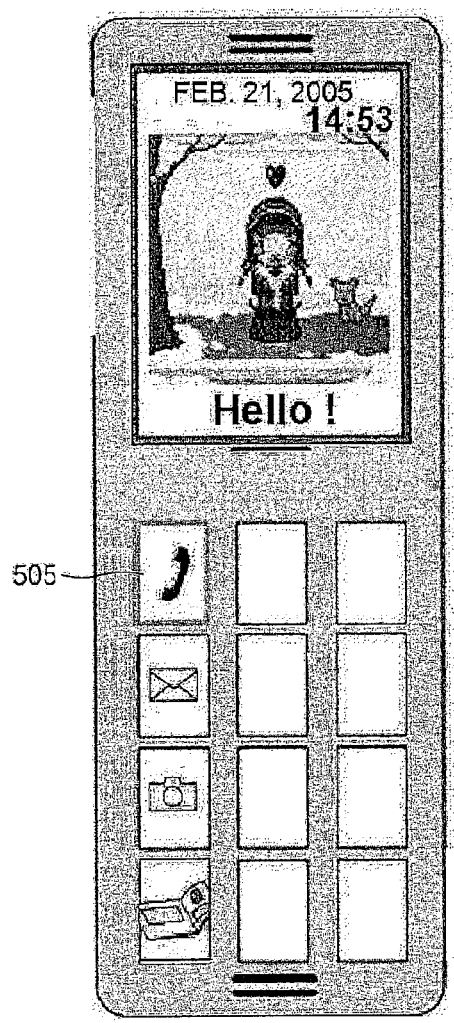

FIG. 7C
FIG. 7D
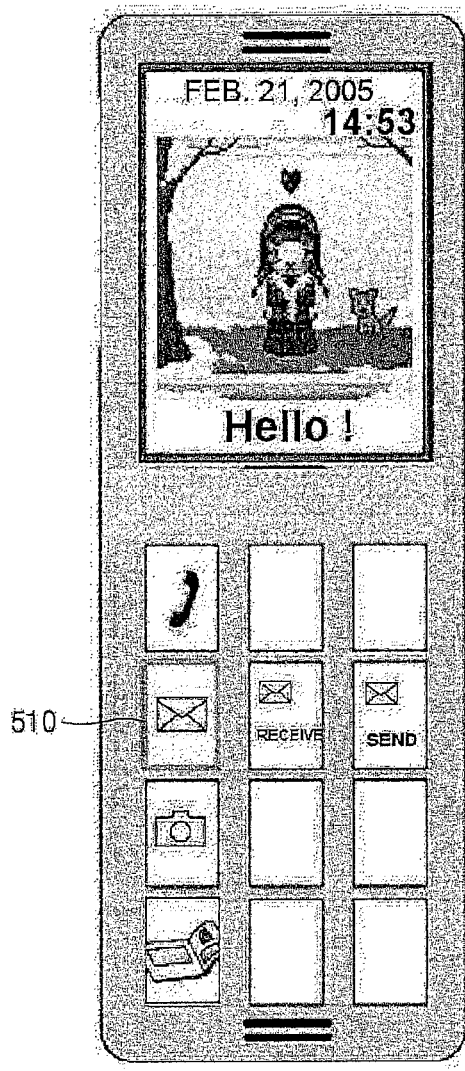
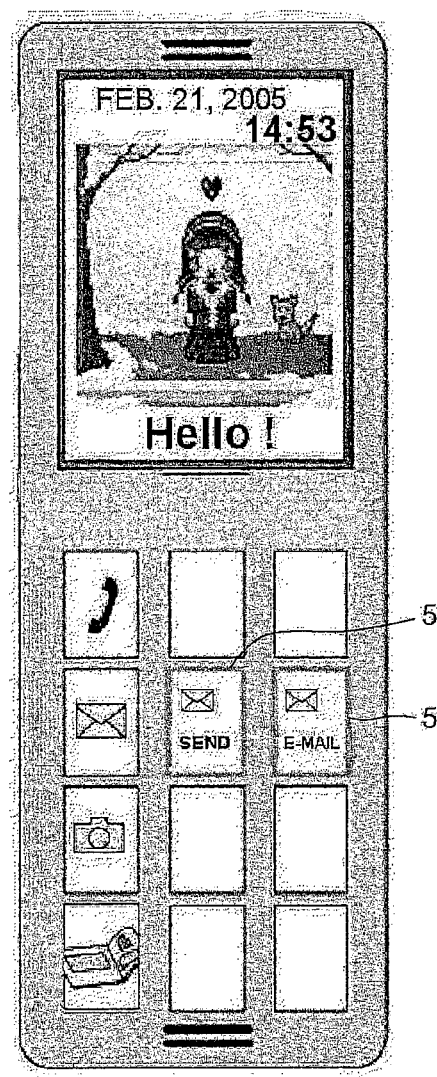

FIG. 8A
FIG. 8B
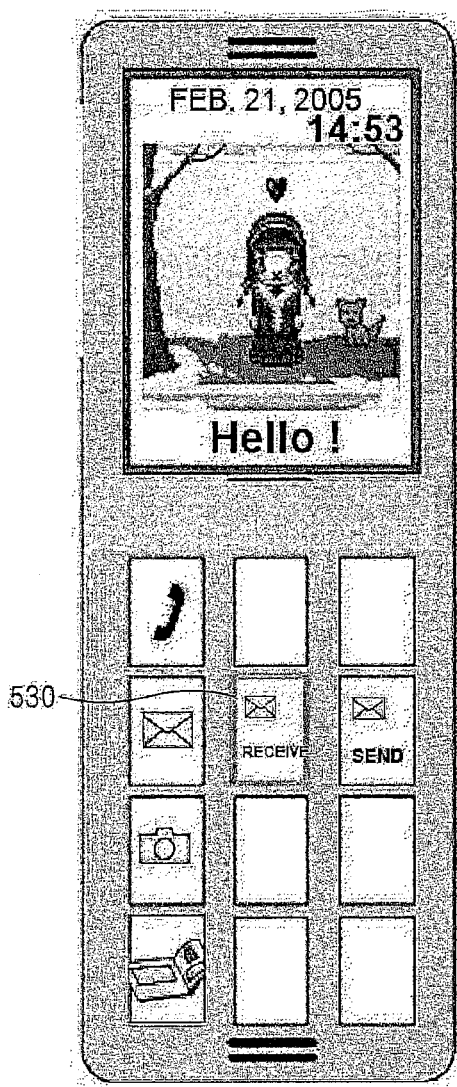
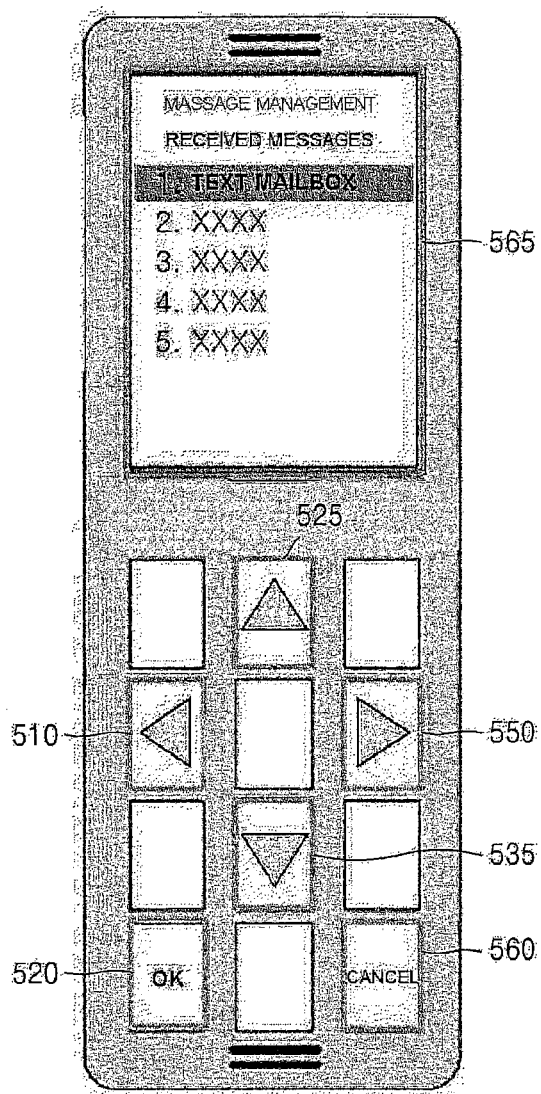

FIG. 9A
FIG. 9B
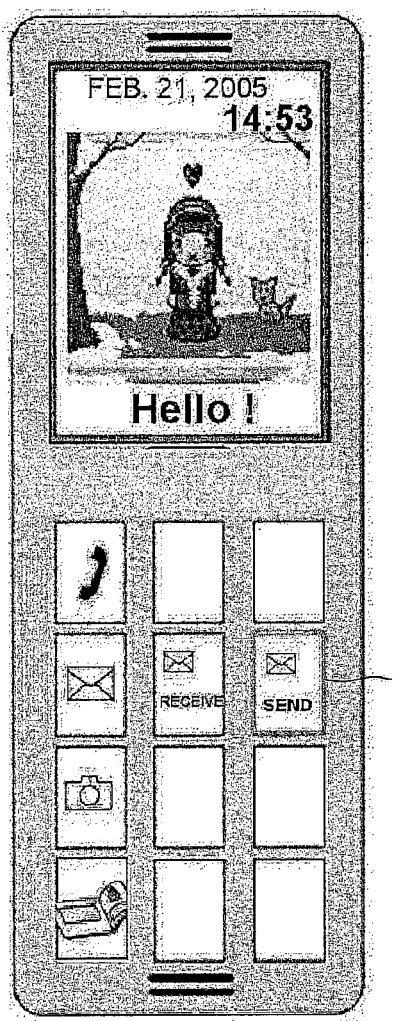
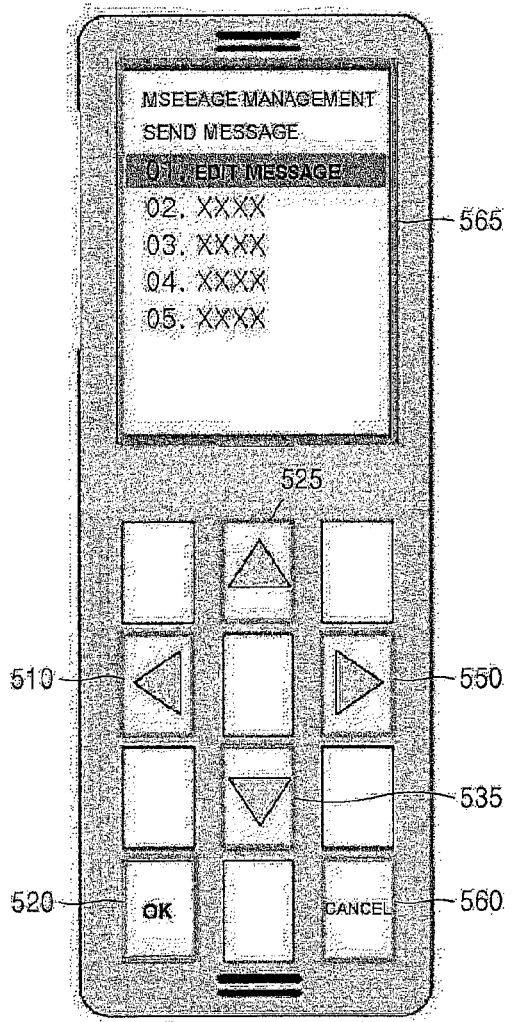

FIG. 9G
FIG. 9H
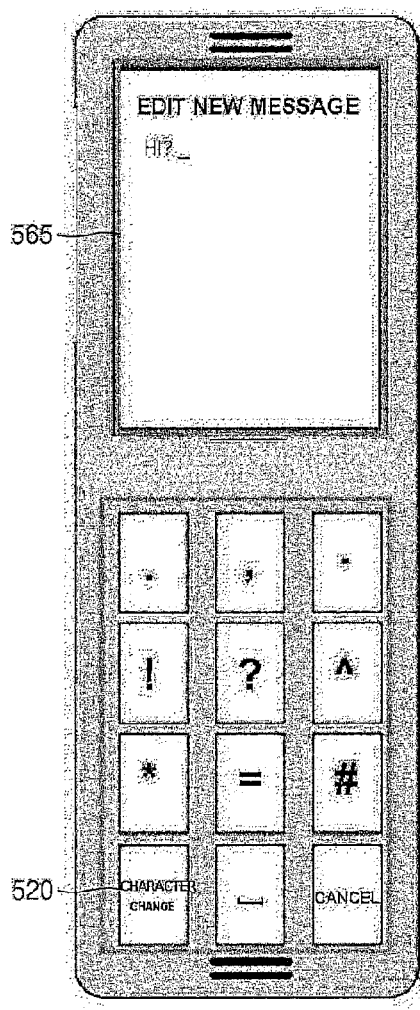
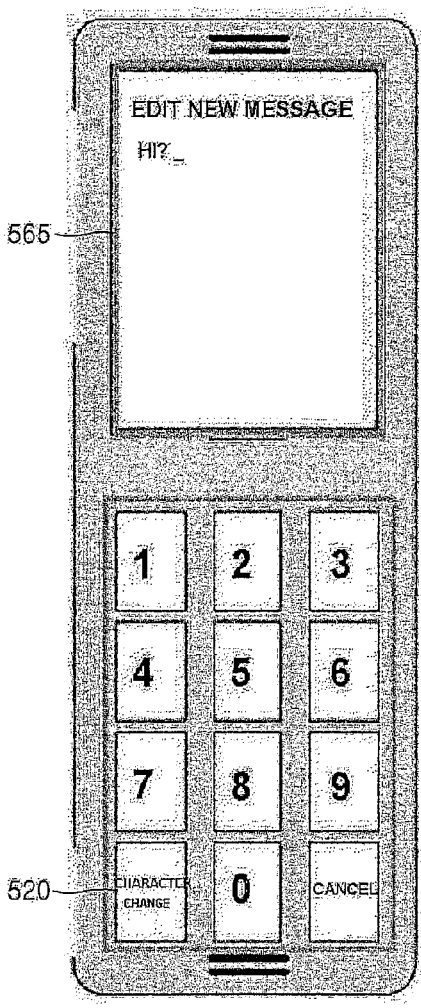

PORTABLE TERMINAL HAVING DISPLAY BUTTONS AND METHOD OF INPUTTING FUNCTIONS USING DISPLAY BUTTONS

CROSS-REFERENCE TO RELATED APPLICATIONS

This application is a continuation of U.S. patent application Ser. No. 14/165,047 filed on Jan. 27, 2014, which is a continuation of U.S. patent application Ser. No. 11/393,894, filed on Mar. 31, 2006, and claims the priority benefit of Korean Patent Applications No. 10-2005-0027557, filed on Apr. 1, 2005 and 10-2005-0071395, filed on Aug. 4, 2005, in the Korean Intellectual Property Office, the disclosures of which are incorporated herein by reference.

BACKGROUND OF THE INVENTION

1. Field of the Invention

The present invention relates to a portable terminal such as a cellular (cell) phone, and more particularly, to a portable terminal having display buttons for displaying images corresponding to specific functions through keys pressed by a user, and a method of inputting functions of the portable terminal using the display buttons.

2. Description of Related Art

A portable terminal user selects a function such as a phone call or short message send/receive function and inputs, for example, Korean characters, English characters, and digits, using a plurality of buttons on the portable terminal.

Recently portable terminals such as cell phones have been developed to integrate and fuse functions of many other electronic devices in addition to basic functions such as a phone call function and a short message function. For example, functions such as an MP3 audio file reproduction function of an MP3 player, image capture and reproduction functions of a digital camera, an electronic dictionary function, and a digital TV function, have been included in recent cell phones.

Such a function increase of a portable terminal accompanies an increase of devices for controlling the functions, but users do not usually want extra complexity, cost or physical size.

Though it is not that difficult to integrate several functions into a portable terminal or to miniaturize a device, due to the development of technology, it is still challenging to provide a user interface through which a user can quickly and easily input complex functions and then control the portable terminal. For example, a user interface is needed for reducing key-press steps for a user to perform a specific function, or for easily managing, searching for, and reproducing digital content such as photographs, video, audio, and e-mails.

For portable terminals, an increasing number of buttons for inputting the extra functions can be a problem, due to complexity of user input according to the limited size and greater number of buttons. On the other hand, without extra buttons, the number of key presses for inputting a specific function increases.

BRIEF SUMMARY

An aspect of the present invention provides a portable terminal having display buttons for displaying variable images corresponding to specific functions through keys pressed by a user to solve the problems when the user inputs one of a plurality of functions in the portable terminal, and a method of inputting functions of the portable terminal using the display buttons.

According to an aspect of the present invention, there is provided a portable terminal having a plurality of input buttons, the portable terminal including: a controller receiving a signal corresponding to a user key input from each of pressed ones of the plurality of input buttons and outputting image data to be displayed on each of the plurality of input buttons based on the received signals; and a plurality of buttons receiving a key input and outputting a signal corresponding to the key input, receiving the image data from the controller, and displaying the received image data.

Each button may include: a keypad whose location is changed when the user pushes it; a signal generator which is located below the keypad and generates a key-input signal in response to the location change of the keypad; and a display module which is located below the signal generator, receives the image data from the controller, and displays the received image data. Each button may include: a keypad whose location is changed when the user pushes it; a display module which is located below the keypad, receives the image data from the controller, and displays the received image data; and a signal generator which is located below the display module and generates a key-press signal in response to the location change of the keypad.

The key-press signal may include a button identification signal corresponding to the button and a button state signal containing information on whether the button is pressed.

The controller may include a plurality of processors corresponding to the plurality of buttons, wherein each of the plurality of processors receives signals of the plurality of buttons and generate's image data to be displayed on a corresponding button.

The plurality of buttons may include a single display module which receives image data to be displayed on the plurality of buttons from the controller and displays the image data.

The portable terminal may further include a memory which stores image data to be displayed on the plurality of buttons.

The controller may receive key-press signals from the plurality of input buttons, read image data corresponding to the received key-press signals from the memory, and output image data to displayed on each of the plurality of input buttons to the input buttons.

According to another aspect of the present invention, there is provided a method of inputting a function to be performed through a plurality of buttons in a portable terminal, the method including: displaying a plurality of images corresponding to a plurality of top-level functions which are performable by the portable terminal, on the buttons; receiving an input selection of one of the top-level functions using a button; displaying images corresponding to lower level functions belonging to the selected top-level function, on the buttons; and receiving an input selection of one of the lower level functions using a button.

The top-level functions may include at least one of a phone call function, a short message function, a camera function, a still image reproduction function, a video reproduction function, a phone book function, an MP3 function, an electronic diary function, a recording/answering function, a device setting function, a Digital Multimedia Broadcasting (DMB) channel guide function, an electronic dictionary function, a file viewing function, and a game function.

In the displaying of images corresponding to lower level functions, if the user inputs the phone call function using a button on which an image corresponding to the phone call function is displayed, the buttons may display images corresponding to integers from 0 to 9, "call start," and "call end."

In the displaying of images corresponding to lower level functions, if the user inputs the short message function using a button on which an image corresponding to the short message function is displayed, the buttons may display images corresponding to "receive," "send," and "e-mail."

The method may further include: if the user inputs the short message send function using a button on which an image corresponding to the send function is displayed, the buttons may display images corresponding to characters to be input.

In the displaying of images corresponding to lower level functions, if the user inputs the camera function using a button on which an image corresponding to the camera function is displayed, the buttons may display images corresponding to "selection of still image or video," "timer," "flash," "zoom in," "zoom out," and "photographing start."

In the displaying of images corresponding to lower level functions, if the user inputs the image reproduction function using a button on which an image corresponding to the image reproduction function is displayed, the buttons may display images corresponding to categories into which images stored in the portable terminal are classified.

According to another aspect of the present invention, there is provided a portable terminal having a plurality of input buttons, the portable terminal including: a data transceiver which receives signals corresponding to a user key input from the plurality of input buttons and sends the signals to an external device using a wireless network or the Internet, and receives images data to be displayed on the plurality of input buttons from the external device using a wireless network or the Internet; and a plurality of buttons which receive a key input from a user and output signals corresponding to the key input, and receive image data to be displayed from the data transceiver and display the image data.

According to another aspect of the present invention, there is provided a portable terminal, including: a plurality of buttons receiving a selection of a function by a press of one of the buttons, each button receiving image data corresponding to selectable function, displaying an image regarding a selectable function based on received the image data, and outputting a signal when pressed; and a controller receiving the signals and outputting the image data, the image data based on the received signals.

According to another aspect of the present invention, there is provided a portable terminal, including: a plurality of buttons receiving selections of functions by presses of a button or buttons, each button receiving first image data corresponding to one of a plurality of selectable top-level functions, displaying an image associated with a top-level function based on the received first image data, receiving second image data corresponding to one of a plurality of lower-level functions which are associated with a selected top-level function based on the received second received image data, displaying an image associated with a lower-level function based on the received second image data, and outputting signals when pressed; and a controller receiving the signals, and outputting the image data, the image data based on the received signals.

According to another aspect of the present invention, there is provided a computer-readable storage medium encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIGS. 6A and 6B are illustrations for explaining a method of inputting a phone call function using display buttons in a cell phone according to an embodiment of the present invention;

FIGS. 7A through 7D are illustrations for explaining a method of inputting a short message function using display buttons in a cell phone according to an embodiment of the present invention;

FIGS. 8A through 8D are illustrations for explaining a method of checking a received short message using display buttons in a cell phone according to an embodiment of the present invention;

FIGS. 9A through 9L are illustrations for explaining a method of editing and sending a short message using display buttons in a cell phone according to an embodiment of the present invention;

DETAILED DESCRIPTION OF EMBODIMENTS

Figure 1:
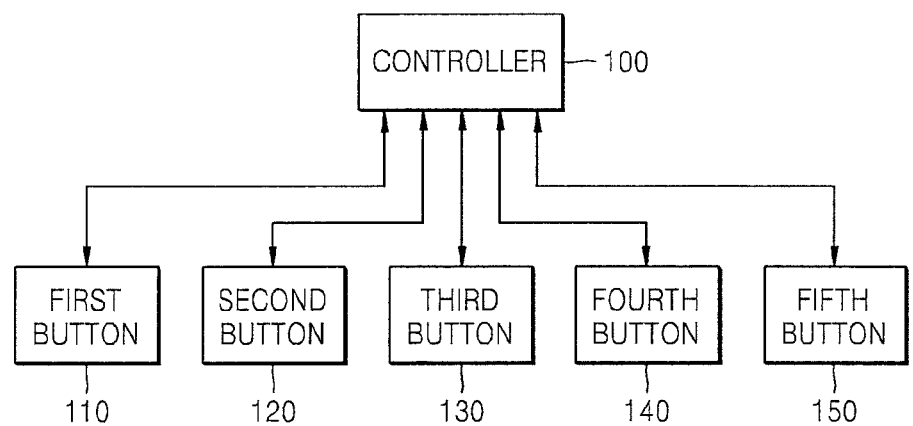
FIG. 1 is a block diagram of a function input system using display buttons according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a function input system using display buttons according to an embodiment of the present invention. The function input system includes a plurality of display buttons 110, 120, 130, 140, and 150 and a controller 100. The operation of the function input system illustrated in FIG. 1 will now be described together with a flowchart illustrating a method of inputting functions in a portable terminal using display buttons according to an embodiment of the present invention illustrated in FIG. 4.

While the function input system illustrated in FIG. 1 shows a portable terminal having five key input buttons, it is to be understood that the number of key input buttons is not limited to this number; for instance, the number of key input buttons in a typical cell phone is twelve.

Figure 4:
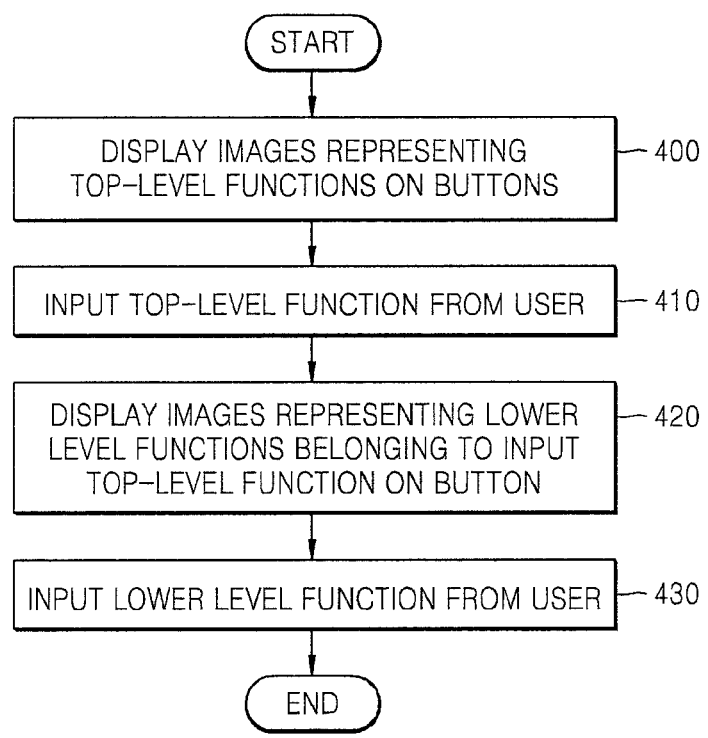
FIG. 4 is a flowchart illustrating a method of inputting functions in a portable terminal using display buttons according to an embodiment of the present invention.

Referring to FIGS. 1 and 4, in operation 400, the display buttons 110, 120, 130, 140, and 150 receive image data predefined to correspond to user selectable top-level functions, from the controller 100 and display the image data. It is advantageous that the top-level functions are main functions used in a cell phone, such as phone call, short message, camera, and image reproduction functions.

In operation 410, the user selects a top-level function by pressing a display button on which an image corresponding to the selected top-level function is displayed, from among the display buttons 110, 120, 130, 140, and 150 on which images corresponding to the top-level functions are displayed, and the pressed display button generates a key code signal containing identification information of the display button and a key input signal containing information on whether the display button is pressed. It is advantageous that the key input signal has the value "1" when the display button is pushed by the user and the value "0" when the display button is not pushed.

The controller 100 receives a key code signal and a key input signal from each of the display buttons 110, 120, 130, 140, and 150 when they are pressed, determines lower-level functions to be displayed on the display buttons 110, 120, 130, 140, and 150, and outputs image data corresponding to the determined lower-level functions. The lower-level functions determined by the controller 100 belong to the top-level function selected by the user in operation 410, and it is advantageous that all lower-level functions are predefined and stored in a memory (not shown). It is advantageous that the controller 100 exists outside the portable terminal, and in that case, it is advantageous that signal or data communication between the display buttons 110, 120, 130, 140, and 150 and the controller 100 is achieved using a wireless data communication method or the Internet.

In operation 420, the display buttons 110, 120, 130, 140, and 150 display images indicating the lower-level functions received from the controller 100. In operation 430, the user selects a lower-level function by pressing a display button on which an image corresponding to the selected lower-level function is displayed, from among the display buttons 110, 120, 130, 140, and 150 on which images corresponding to the lower-level functions are displayed, and the pressed display button generates a key code signal containing identification information of the display button and a key input signal containing information on whether the display button is pressed. The controller 100 receives the key code signal and the key input signal and generates a signal for activating a relevant function execution module (not shown) performing a function corresponding to the key pressed, and then the function execution module performs the lower-level function selected by the user after receiving the signal.

According to the present embodiment, it is possible that further lower-level functions belong to the input lower level-functions. When further lower-level functions belong to the lower-level functions input in operation 430, it is advantageous that operations 420 and 430 are repeated until the user can select a function to be performed.

Figure 2A:
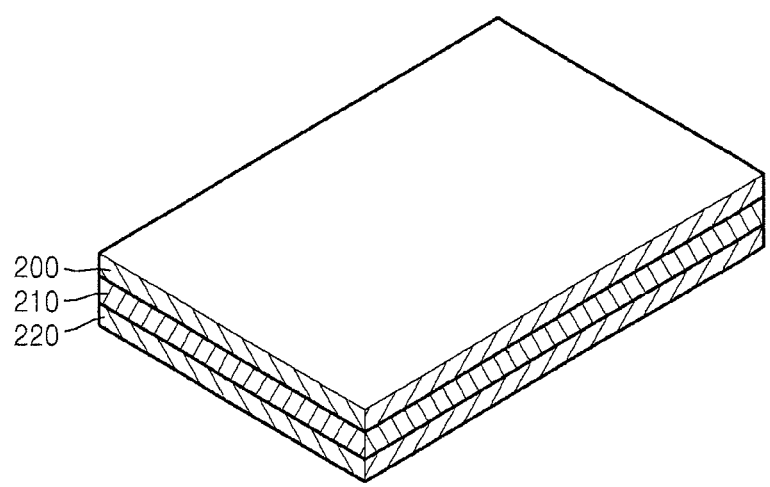
FIGS. 2A through 2E are perspective views of examples of the display buttons of FIG. 1.

FIG. 2A is a perspective view of a first example of the display buttons of FIG. 1. Each display button includes a keypad 200, a display part 210, and a signal generator 220.

When the user pushes the keypad 200, the movement of the keypad 200 is transferred to the signal generator 220, which generates a key code signal for identification of a display button and a key input signal containing information indicating that the display button has been pressed.

Since key input errors for character input can be reduced if the user receives feedback when a display button is pushed and released, it is advantageous that the location of the display button is changed up and down by a key press of the user or that the keypad 200 is located apart from the display part 210 to be moved up and down by a key press of the user.

The display part 210 is located between the keypad 200 and the signal generator 220 as shown in FIG. 2A, and displays an image indicating the user selectable function by receiving image data from the controller 100 of FIG. 1.

Also, in the present embodiment, it is possible that a plurality of display buttons included in the portable terminal share a single display plate and the controller 100 of FIG. 1 outputs image data to be displayed on all the display buttons.

Figure 2B:
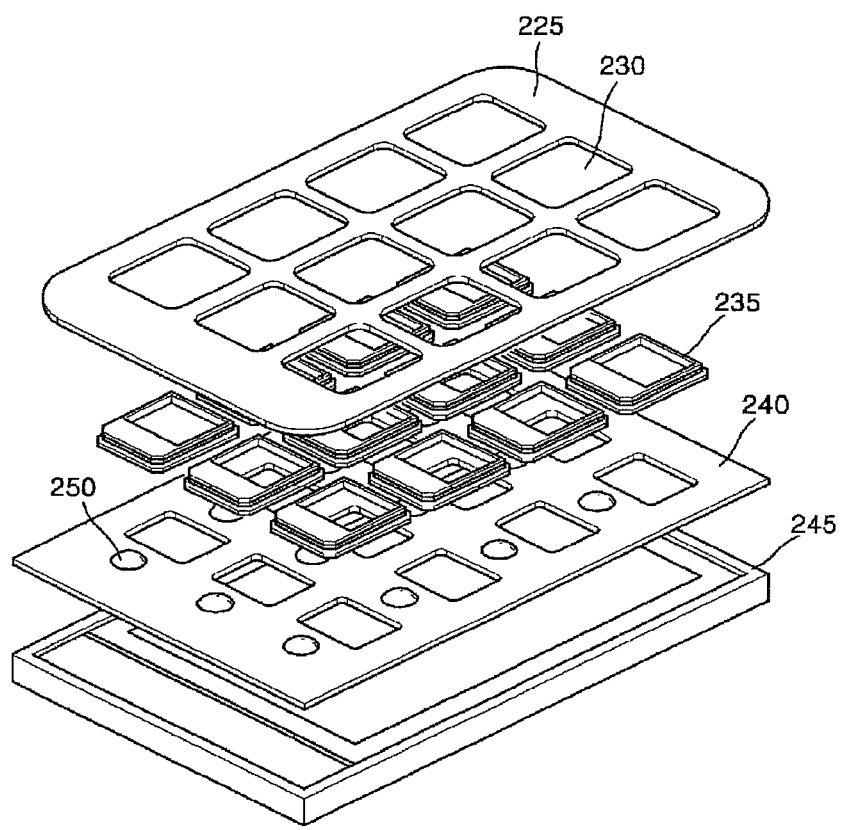
Figure 2C:
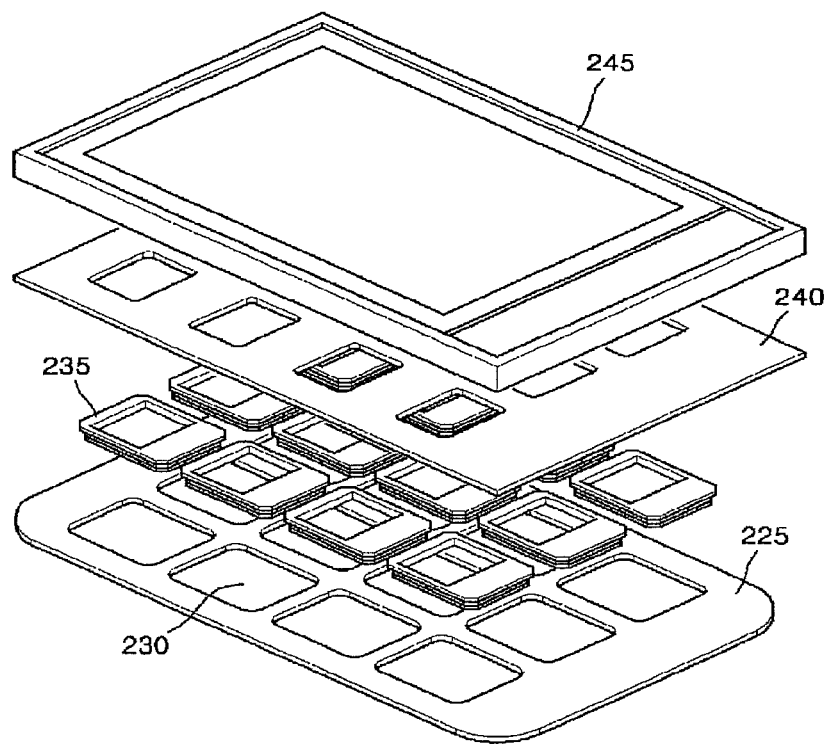

FIGS. 2B and 2C are perspective views of a second example of the plurality of display buttons of FIG. 1 in which the buttons share a single display plate. The display buttons shown in FIGS. 2B and 2C include a cover 225, transparent keypad attachment parts 230, a transparent keypad 235, a switch printed circuit board (PCB) 240, a display plate 245, and switches 250. The transparent keypad attachment parts 230 are formed in the cover 225 so that the user can see images displayed on the display plate 245, and a specific part of the transparent keypad 235 is pushed by a user's button selection.

If a specific part of the transparent keypad 235 is pushed by a user's button selection, a switch 250 located below the pushed part, among the switches 250 formed in the switch PCB 240, generates a signal. The controller 100 receives the signal from the switch 250 and recognizes that a button corresponding to the switch 250 has been selected. The display plate 245 receives image data from the controller 100 and displays images corresponding to every display button. FIG. 2C is a perspective view of the display buttons of FIG. 2B shown from a different direction.

Figure 2D:
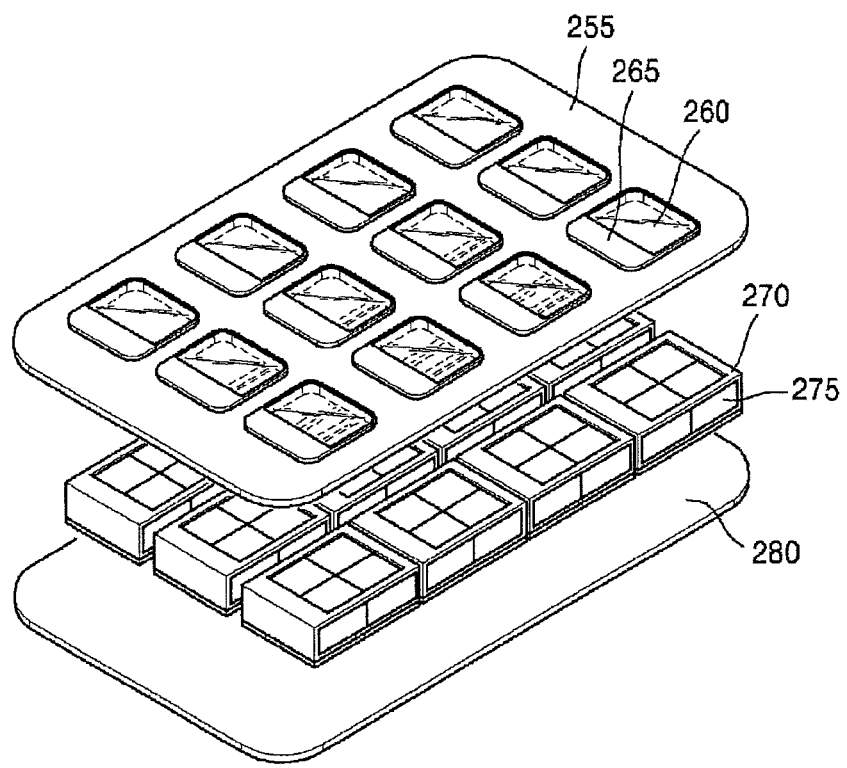
Figure 2E:
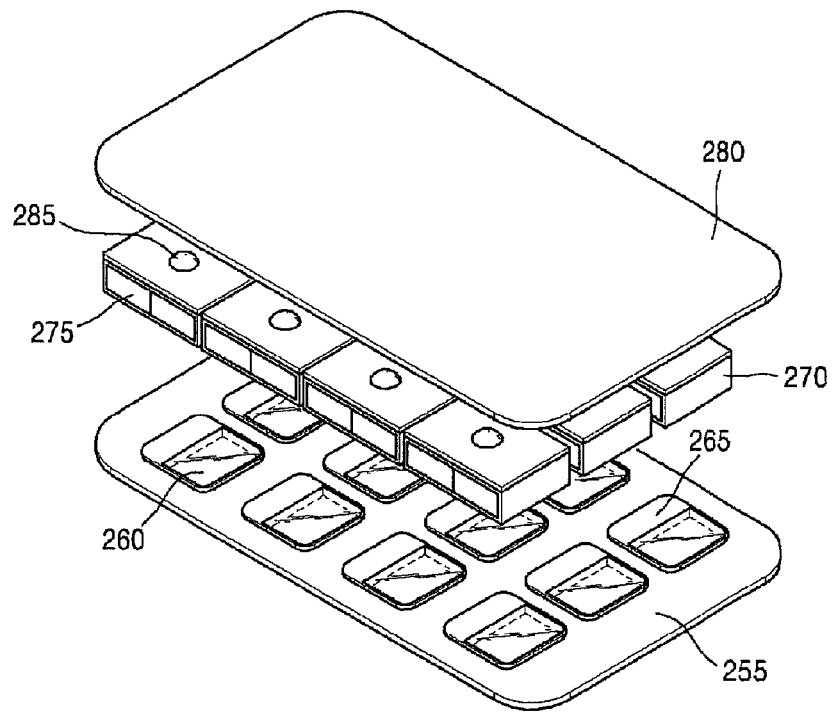

FIGS. 2D and 2E are perspective views of a third example of the display buttons of FIG. 1, the buttons including the same components as the display buttons illustrated in FIGS. 28 and 2C but with different locations. Unlike the display buttons illustrated in FIG. 2B, the display buttons illustrated in FIG. 20 include a cover 255, transparent windows 260, and display parts 275 made up of display plates below keypads 265 to correspond to the display buttons. When a keypad 265 is pushed down, a keypad-switch connection part 270 surrounding the relevant display part 275 moves, and then a switch 285 attached to the bottom of the keypad-switch connection part 270 is pushed by an underlayer 280 and generates a signal. FIG. 2E is a perspective view of the display buttons of FIG. 2D shown from a different direction.

Figure 3:
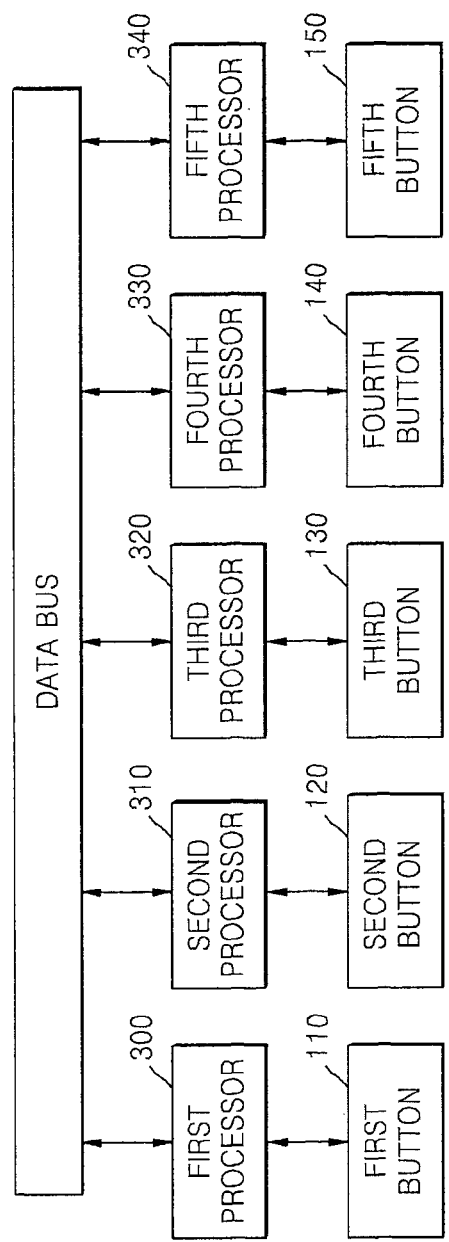
FIG. 3 is a block diagram of a function input system using display buttons according to another embodiment of the present invention.

FIG. 3 is a block diagram of a function input system using display buttons according to another embodiment of the present invention. Referring to FIG. 3, the function input system includes a plurality of display buttons 110, 120, 130, 140, and 150 corresponding respectively to a plurality of processors 300, 310, 320, 330, and 340.

When the first display button 110 is pushed by the user, the first display button 110 generates a key input signal containing information indicating that the first display button 110 has been pressed, and then the first processor 300 receives the key input signal from the first display button 110, generates a signal indicating that the first display button 110 has been pressed, and outputs the signal to the remaining processors 310, 320, 330, and 340 via a data bus.

The first processor 300 generates image data representing a function to be displayed on the first display button 110 using information on whether the first display button 110 has been pressed, which is input from the first display button 110, and information on whether each of the remaining display buttons 120, 130, 140, and 150 has been pressed, which is input from each of the remaining processors 310, 320, 330, and 340, and outputs the generated image data to the first display button 110, and then the first display button 110 receives the image data and displays it.

As described above, each of the plurality of processors 300, 310, 320, 330, and 340 receives information on whether its relevant display button has been pressed from the relevant display button, shares the information with the remaining processors, and generates image data representing a function to be displayed on the relevant display button using information on whether the display buttons 110, 120, 130, 140, and 150 have been pressed.

Figure 5:
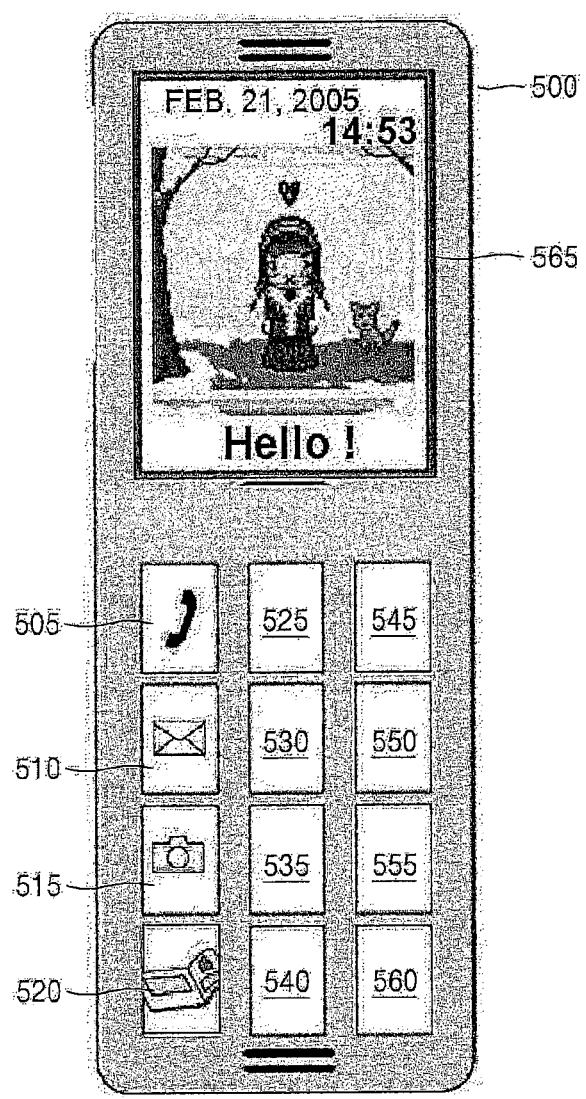
FIG. 5 is a plan view of a cell phone having display buttons according to an embodiment of the present invention.

FIG. 5 is a plan view of a cell phone 500 having display buttons according to an embodiment of the present invention. The cell phone 500 illustrated in FIG. 5 includes a main display module 565 and a plurality of key-press display buttons 505, 510, 515, 520, 525, 530, 535, 540, 545, 550, 555, and 560. As shown in FIG. 5, before the user inputs a function, images representing top-level functions are displayed on the display buttons 505, 510, 515, 520, 525, 530, 535, 540, 545, 550, 555, and 560. An image representing a phone call function is displayed on the first display button 505, an image representing a short message function is displayed on the second display button 510, an image representing a camera function is displayed on the third display button 515, and an image representing an image reproduction function is displayed on the fourth display button 520.

FIGS. 6A and 6B are illustrations for explaining a method of inputting the phone call function using the display buttons in the cell phone 500 of FIG. 5 according to an embodiment of the present invention. If the user pushes the first display button 505 representing the phone call function, from among the display buttons shown in FIG. 6A, images representing integers from 0 to 9 for inputting a telephone number, a call start function, and a call end function are displayed on the display buttons as shown in FIG. 6B.

Figure 7A:
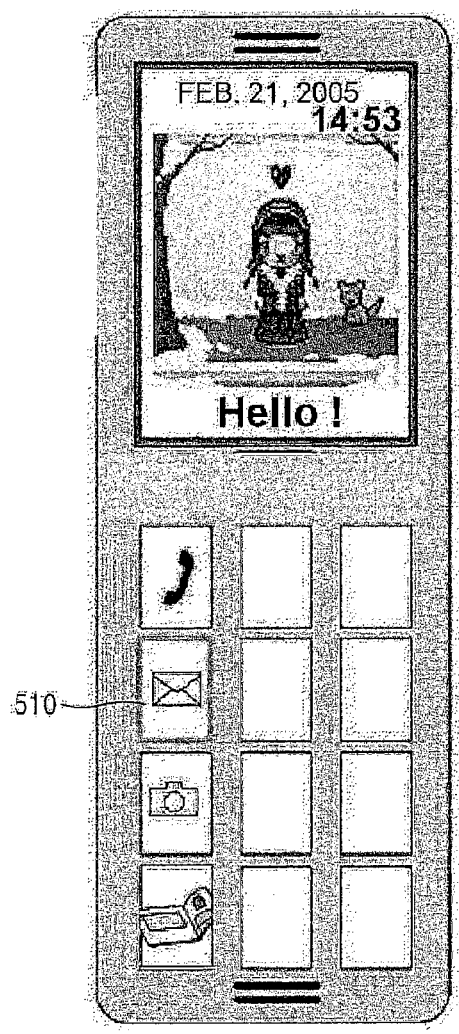
Figure 7B:
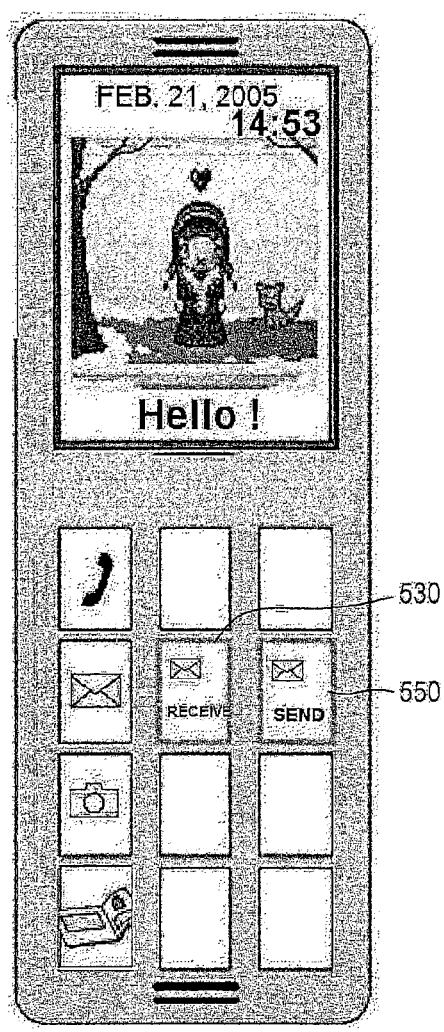

FIGS. 7A through 7D are illustrations for explaining a method of inputting the short message function using the display buttons in the cell phone 500 of FIG. 5 according to an embodiment of the present invention. If the user pushes the second display button 510 representing the short message function, from among the display buttons shown in FIG. 7A, as shown in FIG. 78, an image representing a receive function, which is a lower level function of the short message function, is displayed on the sixth display button 530, and an image representing a send function, which is a lower level function of the short message function, is displayed on the tenth display button 550. If the user pushes the second display button 510 again, when the images representing the receive function and the send function are displayed on the two display buttons as shown in FIG. 7C, an image representing an e-mail function, which is another lower level function of the short message function, is displayed on the tenth display button 550, as shown in FIG. 7D.

FIGS. 8A through 8D are illustrations for explaining a method of checking a received short message using the display buttons in the cell phone 500 of FIG. 5 according to an embodiment of the present invention. If the user inputs the receive function by pushing the sixth display button 530 in the state shown in FIG. 8A, categories of received messages are displayed on the main display module 565, and images representing direction keys for selecting one of the categories displayed on the main display module 565, an "OK" button, and a "cancel" button for returning to the top-level function are displayed on the relevant display buttons.

Figure 8C:
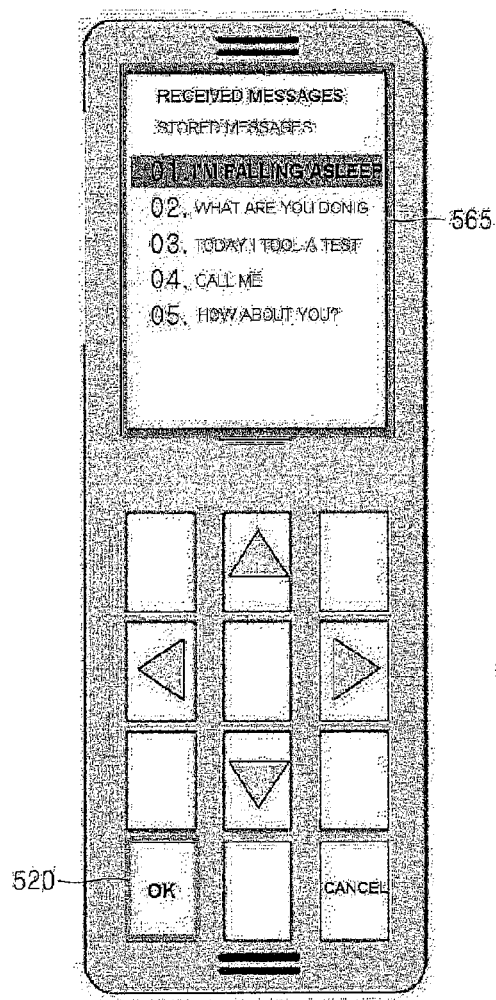
Figure 8D:
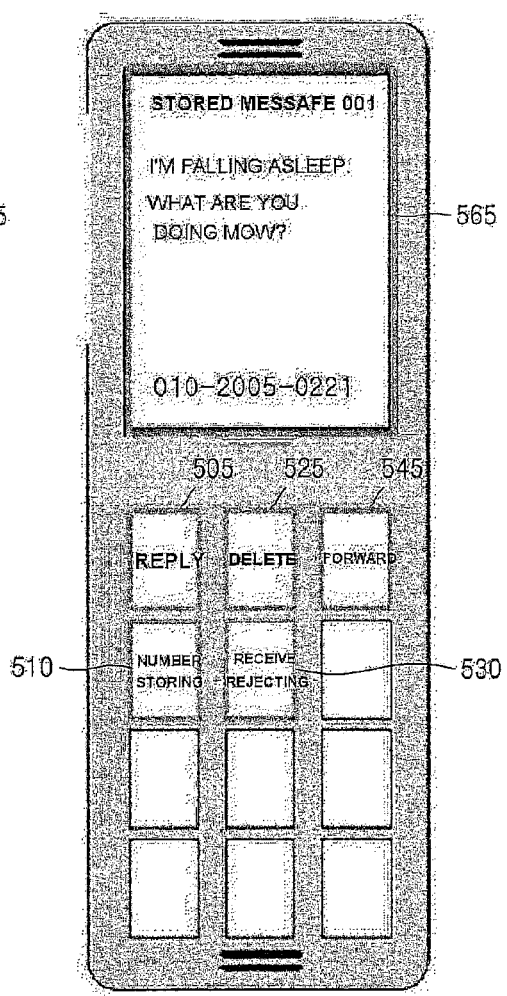

If the OK button, i.e. the fourth display button 520 shown in FIG. 8B, is pushed, received short messages are displayed on the main display module 565, as shown in FIG. 8C. If a short message is selected using direction keys displayed on the display buttons, as shown in FIG. 8D, the contents of the selected short message are displayed on the main display module 565, an image representing a response function for sending a short message to the sender of the message is displayed on the first display button 505, an image representing a number storage function for storing the telephone number of the sender is displayed on the second display button 510, an image representing a delete function for deleting the selected short message is displayed on the fifth display button 525, an image representing a reject function for rejecting other short messages from the sender is displayed on the sixth display button 530, and an image representing a forward function for forwarding the selected short message to another cell phone is displayed on the ninth display button 545. The user can manage the received short messages by selecting the functions on the display buttons 505, 510, 525, 530, and 545.

Figure 9C:
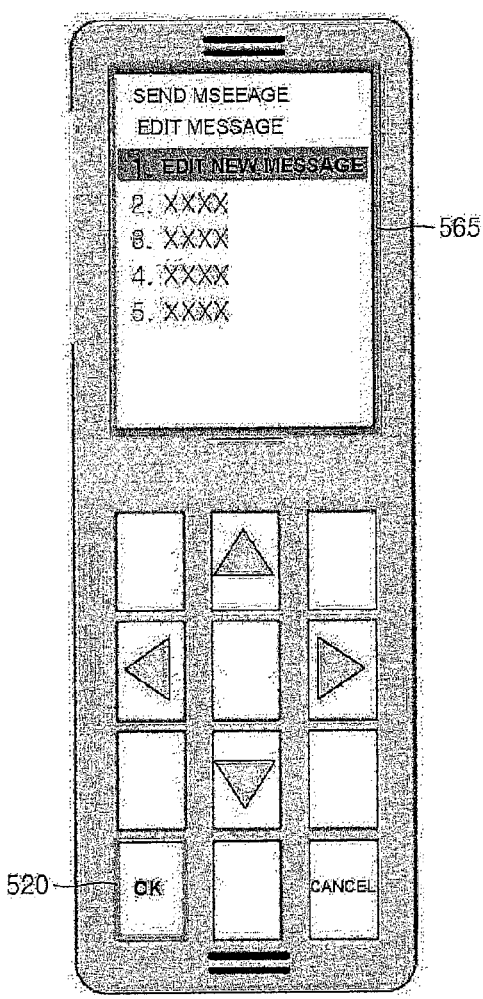

FIGS. 9A through 9L are illustrations for explaining a method of editing and sending a short message using the display buttons in the cell phone 500 of FIG. 5 according to an embodiment of the present invention. If the user inputs the send function by pushing the tenth display button 550 in the state shown in FIG. 9A, categories related to the short message sending are displayed on the main display module 565, and images representing direction keys for selecting one of the categories displayed on the main display module 565, an "OK" button, and a "cancel" button for returning to the top-level function are displayed on the relevant display buttons, as shown in FIG. 9B.

Figure 9D:
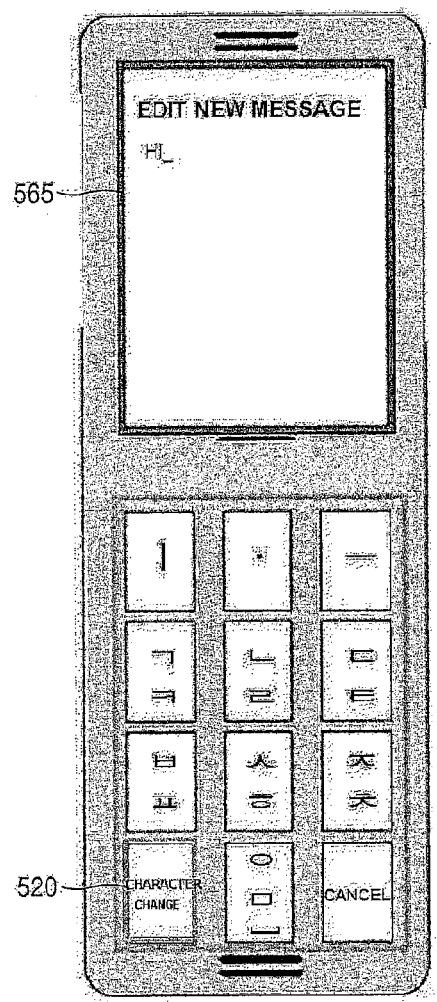
Figure 9E:
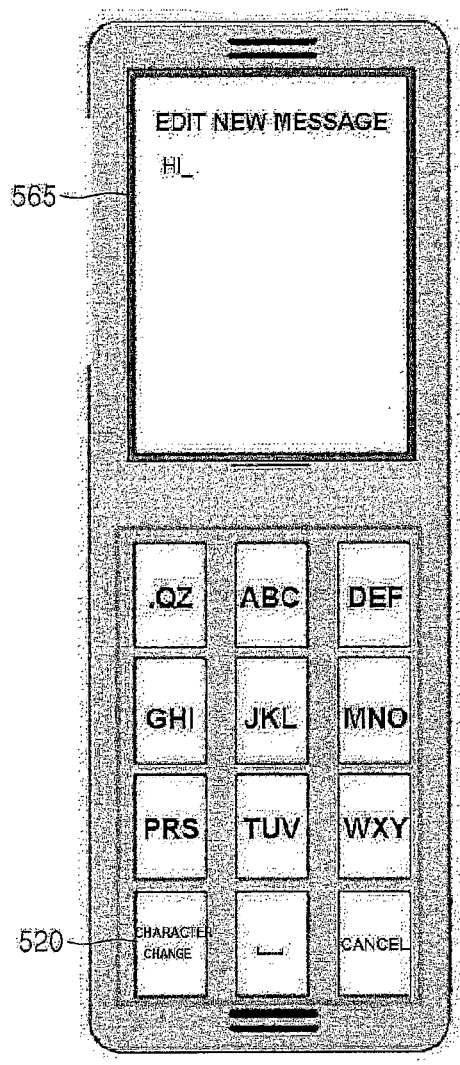
Figure 9F:
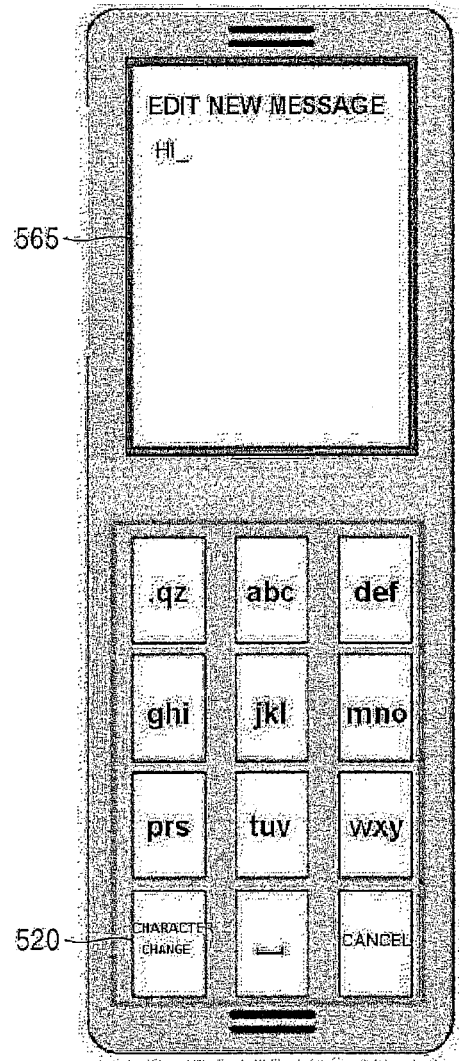
Figure 9I:
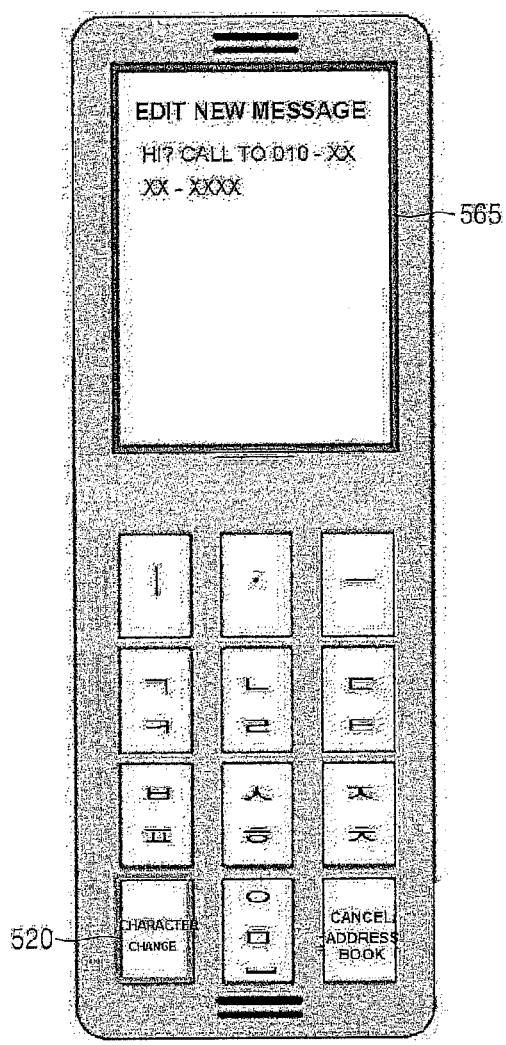

If the user selects "write a new message" by pushing the fourth display button 520 shown in FIG. 9C, Korean consonants and vowels for inputting characters, and an image representing a character change function for changing the images displayed on the display buttons are displayed on the display buttons, as shown in FIG. 9D. If the user inputs the character change function by pushing the fourth display button 520 shown in FIG. 9D, uppercase letters for inputting English are displayed on the display buttons as shown in FIG. 9E, and if the fourth display button 520 is pushed again, lowercase letters for inputting English are displayed on the display buttons as shown in FIG. 9F. If the fourth display button 520 is pushed once more in the state shown in FIG. 9F, special symbols are displayed on the display buttons as shown in FIG. 9G; if the fourth display button 520 is pushed once more in the state shown in FIG. 9G, digits are displayed on the display buttons as shown in FIG. 9H; and if the fourth display button 520 is pushed once more in the state shown in FIG. 9H, Korean consonants and vowels, i.e. the initial character input state, are displayed on the display buttons as shown in FIG. 9I.

Figure 9J:
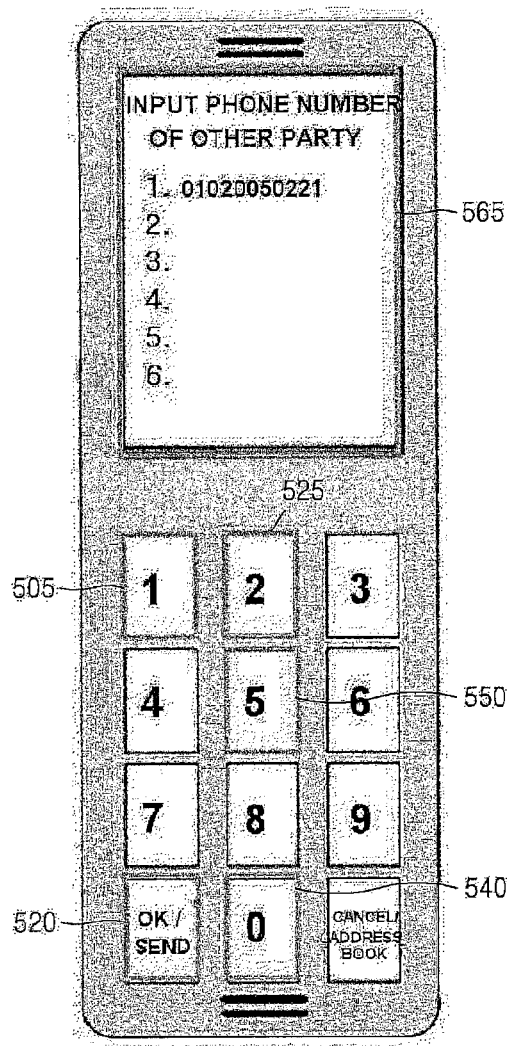
Figure 9K:
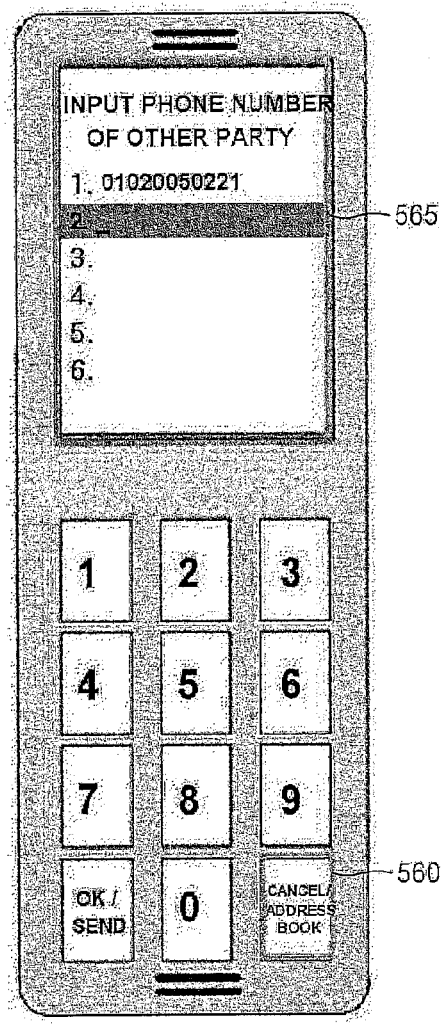

When the character input is finished, if the fourth display button 520 is pushed for at least a predetermined time, as shown in FIG. 9J, a screen for inputting a receiving cell phone number is displayed on the main display module 565, digits for inputting a telephone number are displayed on the display buttons, and an image representing a send function for sending the short message is displayed on the fourth display button 520. As shown in FIG. 9K, an address book function can be selected by pushing the twelfth display button 560 displayed as "cancel/address book," and then telephone numbers of cell phones which will receive the short message can be input by searching an address book stored in the cell phone.

Figure 9L:
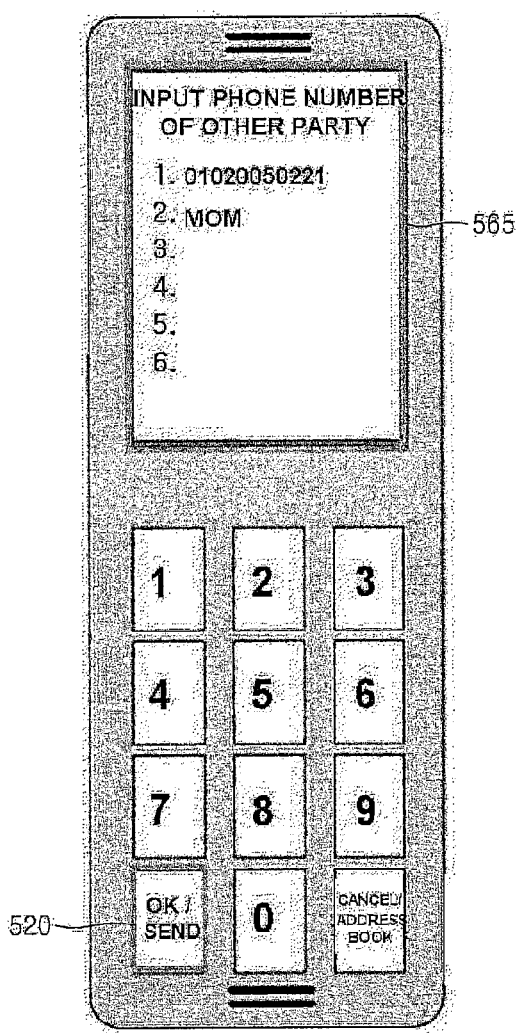

After the short message has been created and the recipient's telephone numbers have been input according to the method described above, the short message can be sent by pushing the fourth display button 520 on which "OK/send" is displayed, for at least a predetermined time, as shown in FIG. 9L.

FIGS. 10A through 10E are illustrations for explaining a method of inputting the camera function using the display buttons in the cell phone 500 of FIG. 5 according to an embodiment of the present invention. If the camera function is selected by pushing the third display button 515, from among the display buttons shown in FIG. 10A, images representing lower level functions belonging to the camera function are displayed on the display buttons, as shown in FIG. 108, and pictures to be photographed are displayed on the main display module 565.

If a "photo/video" button, i.e. the ninth display button 545, is pushed, a still image photographing function and a video photographing function are alternated in a toggle switch method. A camera zoom-in function or a camera zoom-out function can be selected using the tenth or eleventh display button 550 or 555, and a self timer function for delaying the photographing time can be selected by pushing the fifth display button 525. In addition, a camera flash function can be selected using the first display button 505, the start and end of the still image photographing or the video photographing can be selected using the twelfth display button 560, and the top-level functions can be displayed by pushing a "cancel" button, i.e. the fourth display button 520.

Figure 10A:
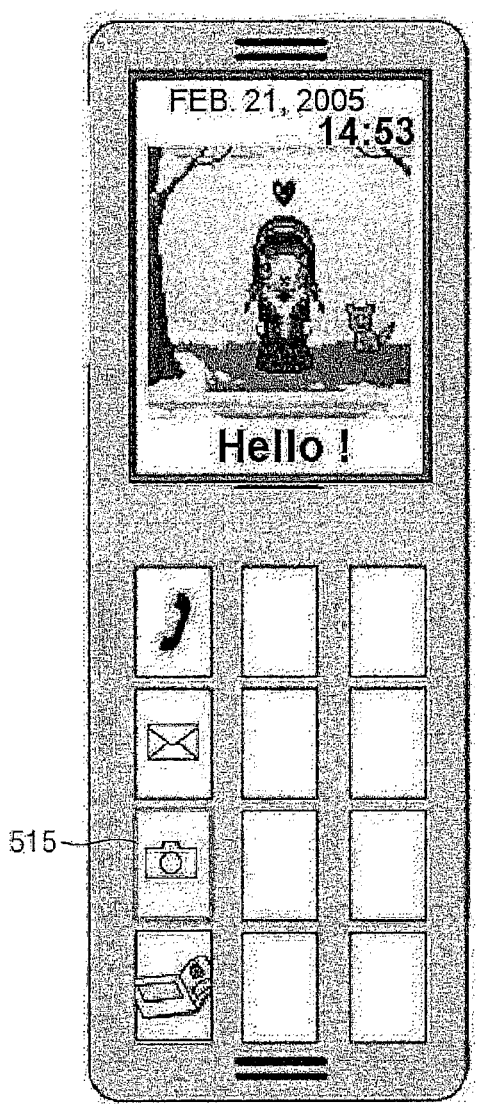
FIGS. 10A through 10E are illustrations for explaining a method of inputting a camera function using display buttons in a cell phone according to an embodiment of the present invention.
Figure 10B:
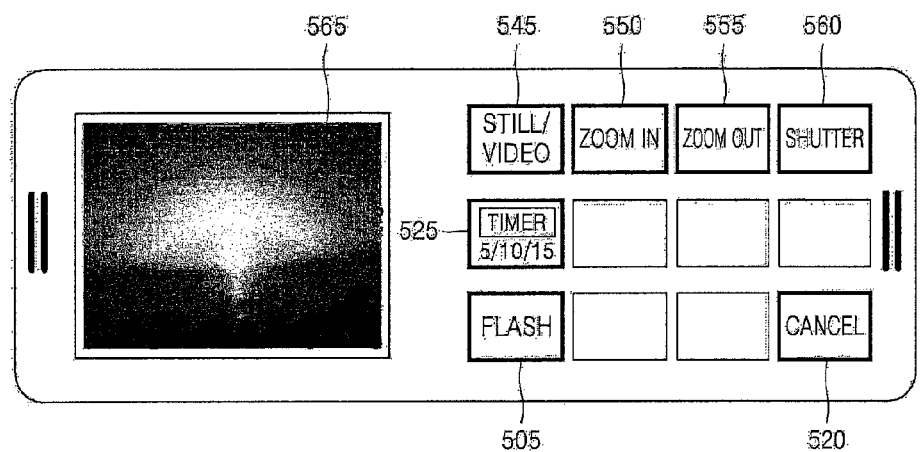
Figure 10C:
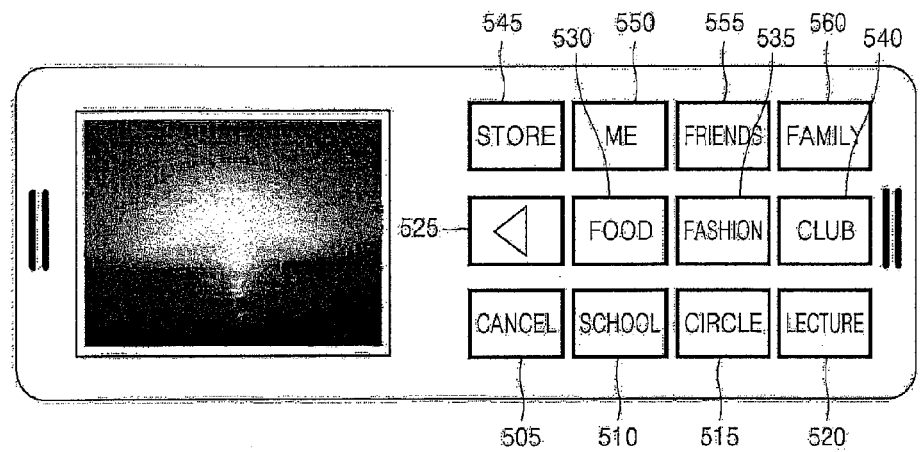
Figure 10D:
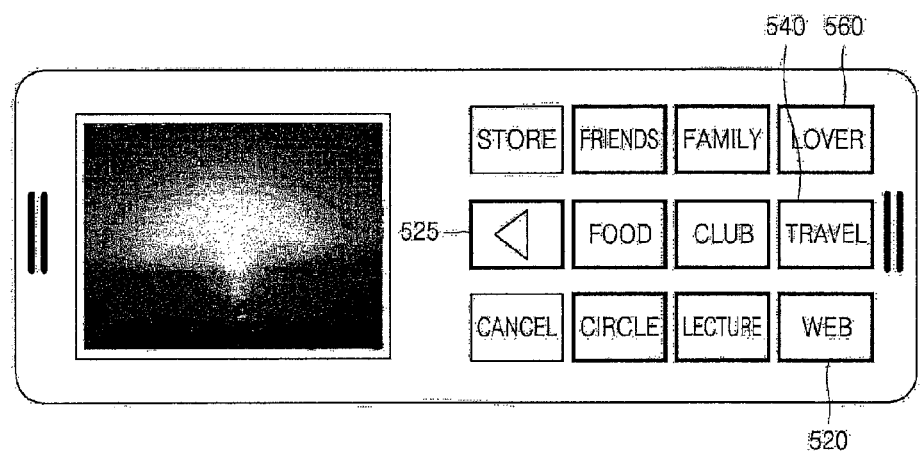

If the photographing is finished according to the method described above, an image representing a storage function for storing the photographed image data in the cell phone is displayed on the ninth display button 545, and categories for the photographed image data to be stored are displayed on other display buttons 510, 515, 520, 530, 535, 540, 550, 555, and 560, as shown in FIG. 10C. The user can change the categories displayed on the display buttons 510, 515, 520, 530, 535, 540, 550, 555, and 560 as shown in FIG. 100 by pushing the fifth display button 525 on which a direction key is displayed. In addition, the user can cancel storing the photographed image data in the cell phone by pushing the first display button 505.

Figure 10E:
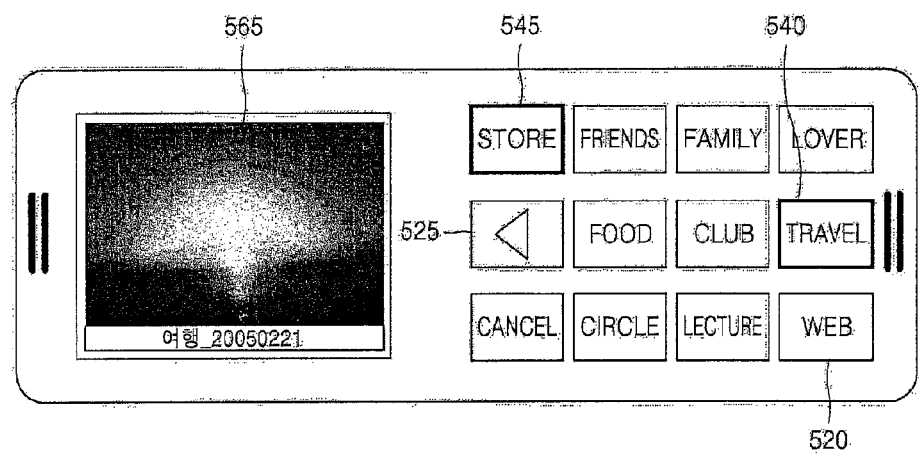

As shown in FIG. 10E, if the user pushes the ninth display button 545 and then selects the "travel" category using the eighth display button 540, the photographed image data is stored in the selected category.

Figure 11A:
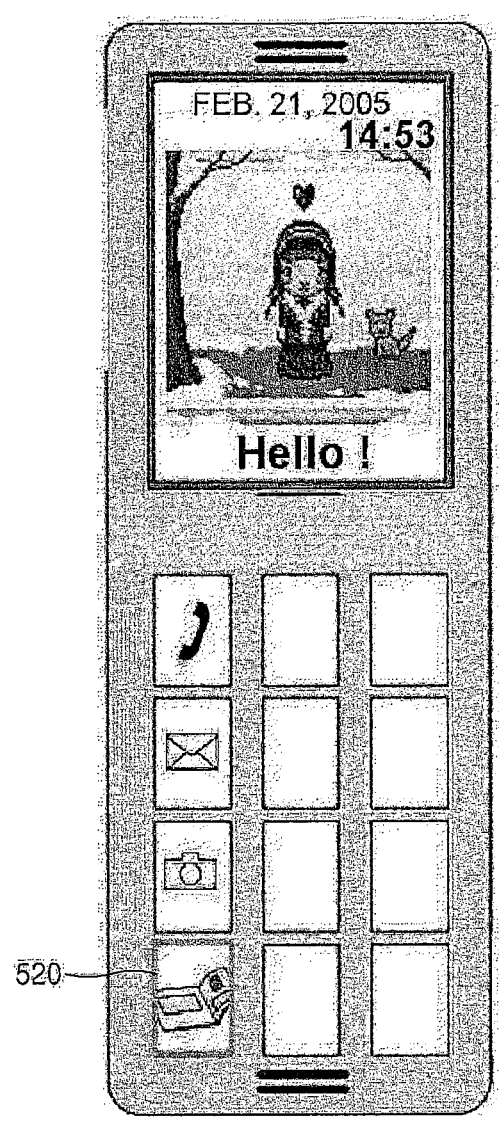
FIGS. 11A through 11C are illustrations for explaining a method of inputting an image reproduction function using display buttons in a cell phone according to an embodiment of the present invention.
Figure 11B:
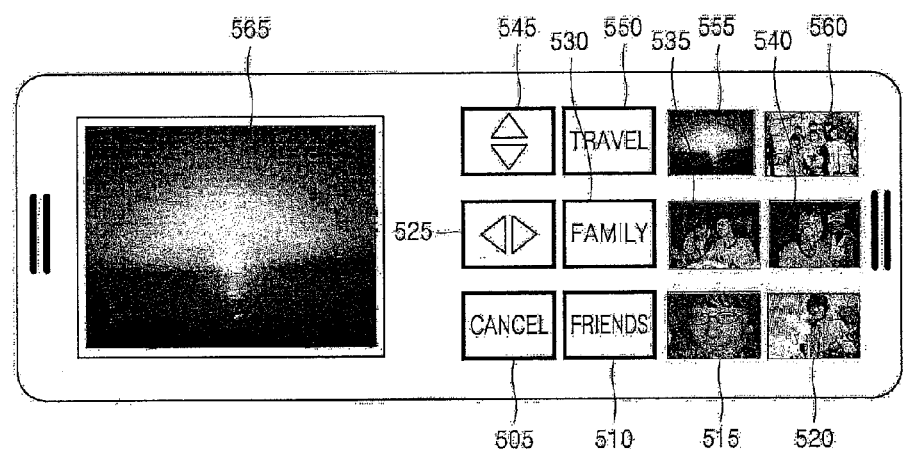
Figure 11C:
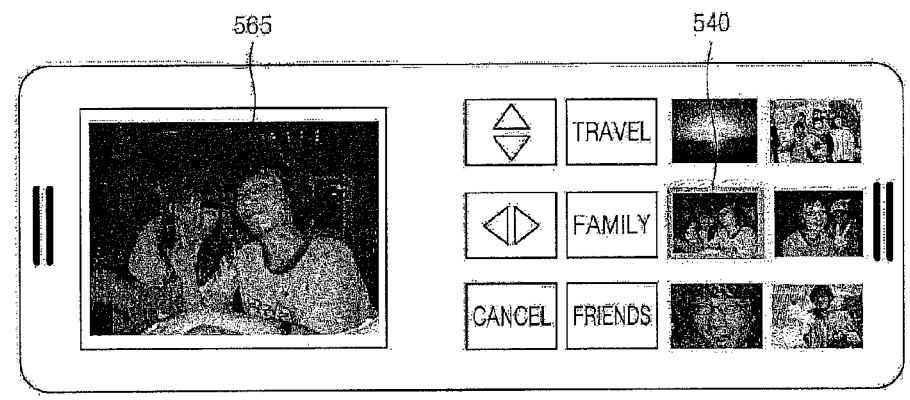

FIGS. 11A through 11C are illustrations for explaining a method of inputting the image reproduction function using the display buttons in the cell phone 500 according to an embodiment of the present invention. If the fourth button 520 representing the image reproduction function is pushed, from among the display buttons shown in FIG. 11A, categories of image data stored in the cell phone and representative images from the image categories are displayed on the display buttons as shown in FIG. 11B.

In detail, as shown in FIG. 11B, image categories "friends," "family," and "travel" are respectively displayed on the second, sixth, and tenth display buttons 510, 530, and 550, and representative images from each image category are displayed on the display buttons located on the right of each display button on which the image category is displayed. The number of image categories can be more than the three shown in FIG. 3B, and in that case, it is advantageous that the three image categories in which images have most recently been stored are displayed on the second, sixth, and tenth display buttons 510, 530, and 550. In addition, it is advantageous that representative images displayed on the display buttons located on the right of the display buttons on which the image categories are displayed are the two most recently photographed images from the displayed image categories.

The ninth display button 545 represents an up/down direction key, and when pushed, a category changeable mode and a category unchangeable mode are alternated in a toggle switch method. If the user selects the category changeable mode by pushing the ninth display button 545, pushes the sixth display button 530 located at the center of the display buttons displaying image categories, and consecutively pushes the tenth display button 550 located above the sixth display button 530, each of the image categories displayed on the relevant display buttons is moved one column upward, and a new category and two representative images belonging to the new category are displayed on the second, third, and fourth display buttons 510, 515, and 520. Image categories can be moved downward in a similar way, and the image categories can be moved two columns upward by consecutively pushing the second display button 510 and the tenth display button 550.

A left/right direction key is displayed on the fifth display button 525, and the left direction key and the right direction key are alternatively displayed on the fifth display button 525 every time the fifth display button 525 is pushed. As shown in FIG. 11C, if a display button for displaying a desired image category is pushed while the left or right direction is displayed on the fifth display button 525, by pushing the fifth display button 525, images belonging to the selected image category can be moved in a direction selected by the fifth display button 525. If one of the images displayed on display buttons is selected using the display buttons displaying image categories and the fifth display button 525, the selected image is displayed on the main display module 565.

Figure 12:
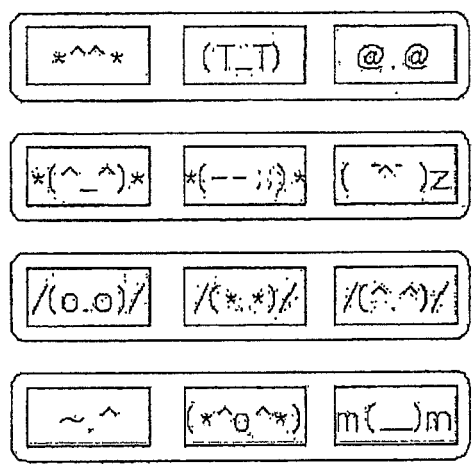
FIG. 12 is an exemplary illustration of emoticons which can be displayed on the display buttons.

FIG. 12 is an exemplary illustration of emoticons which can be displayed on the display buttons. Herein, the portable terminal has 12 display buttons, and each of the display buttons display an emotion as illustrated in FIG. 12.

The emoticons to be displayed can be changed according to the manipulation of moving key by a user. The moving key is prepared on the portable terminal. Leftward direction key, rightward direction key, upward direction key, or downward direction key is an example of the moving key.

Embodiments of the present invention include a general-purpose computer by running a program from a computer-readable medium, including but not limited to storage media such as magnetic storage media (ROMs, RAMs, floppy disks, magnetic tapes, etc.), and optically readable media (CO-ROMs, DVDs, etc.). The present invention may be embodied as a computer-readable medium having a computer-readable program code unit embodied therein for causing a number of computer systems connected via a network to effect distributed processing.

According to the above-described embodiments of the present invention, in a portable terminal having display buttons and a method of inputting functions using the display buttons, by using the display buttons for displaying variable images corresponding to specific functions as well as an essential function of inputting keys from a user when a specific function is input to the portable terminal such as a cell phone, a plurality of functions can be input with only a limited number of buttons, providing speed and convenience to the user for function input. In addition, since a conventional button may need to show digits, Korean characters, and English letters, the symbols are small and difficult to read quickly. However, when the user uses a specific function using the display buttons according to the present invention, a digit, character, or image suitable for the function can be displayed, allowing the user to quickly identify a key to be pressed.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A portable terminal comprising:

a camera configured to capture at least one image;

a main display for displaying the captured at least one image;

a plurality of displayable inputs respectively configured to display a function related to image photographing or video photographing in response to a signal to operate the camera;

a memory configured to store the captured at least one image;

a controller configured to control, in response to the at least one image being captured, the plurality of the displayable inputs to display a storage function for storing the captured image and at least one categorizing function for storing the captured image according to at least one category.

* * * * *